United States Patent [19]

Reed

[11] Patent Number: 5,108,782

[45] Date of Patent: Apr. 28, 1992

[54] SILICONE RELEASE COMPOSITION

[75] Inventor: W. Michael Reed, York, Pa.

[73] Assignee: P. H. Glatfelter Company, Spring Grove, Pa.

[21] Appl. No.: 726,804

[22] Filed: Jul. 8, 1991

Related U.S. Application Data

[62] Division of Ser. No. 524,979, May 18, 1990, abandoned.

[51] Int. Cl.$^5$ .............................................. B05D 3/06
[52] U.S. Cl. ................................... 427/54.1; 427/387; 427/388.2; 427/389.7; 427/391; 427/393.5; 428/447; 524/366; 524/588; 525/409
[58] Field of Search .................. 427/387, 54.1, 388.2, 427/389.7, 391, 393.5; 524/366, 588; 525/100, 476, 409; 526/932; 106/287.12, 287.13; 428/447

[56] References Cited

U.S. PATENT DOCUMENTS

| | | | |
|---|---|---|---|
| 3,261,881 | 7/1966 | Christenson | 260/826 |
| 3,268,464 | 8/1966 | Suter | 260/24 |
| 3,395,071 | 7/1968 | Nitzache | 162/155 |
| 3,580,866 | 5/1971 | Ito | 260/2 |
| 4,317,849 | 3/1982 | Ogura et al. | 427/362 |
| 4,423,095 | 12/1983 | Blizzard | 427/387 |
| 4,504,549 | 3/1985 | Pines | 428/447 |
| 4,629,634 | 12/1986 | Coughlan et al. | 427/179 |
| 4,704,416 | 11/1987 | Eck | 524/17 |
| 4,803,233 | 2/1989 | Narula | 524/58 |
| 4,830,924 | 5/1989 | Dallavia, Jr. | 428/429 |
| 4,859,511 | 8/1989 | Patterson | 428/40 |
| 4,867,828 | 9/1989 | McIntyre | 156/247 |
| 4,954,554 | 9/1990 | Bunge | 528/388 |

FOREIGN PATENT DOCUMENTS

| | | |
|---|---|---|
| 0737888 | 7/1966 | Canada. |
| 0953057 | 8/1982 | U.S.S.R. |
| 2040734 | 9/1980 | United Kingdom. |

OTHER PUBLICATIONS

Polysciences catalog, 1990–1991, p. D32.
Molyneux "Water-Soluble Synthetic Polymers: Properties and Behavior", CRC Press, Inc., Boca Raton, Fla., 1984, pp. 119–145.
Union Carbide Chemicals and Plastics Company Inc., Polyox-Water, Water Soluble Resins, 1990.
Textbook of Polymer Science, 3rd Ed., 1984, pp. 392–393.

Primary Examiner—Michael Lusignan
Attorney, Agent, or Firm—Fisher, Christen & Sabol

[57] ABSTRACT

A silicone release coating emulsion includes a reactive crosslinkable silicone, a catalyst and a high molecular weight, water soluble or water dispersible polymeric thickening agent such as polyethylene oxide. The polymeric thickening agent has a molecular weight greater than about 100,000 g/mole Mw. The silicone release emulsion is applied as a coating to a substrate, and particularly paper, and cured to form a release coating for pressure sensitive adhesives. The silicone emulsion exhibits improved holdout of the silicone from the substrate.

22 Claims, 1 Drawing Sheet

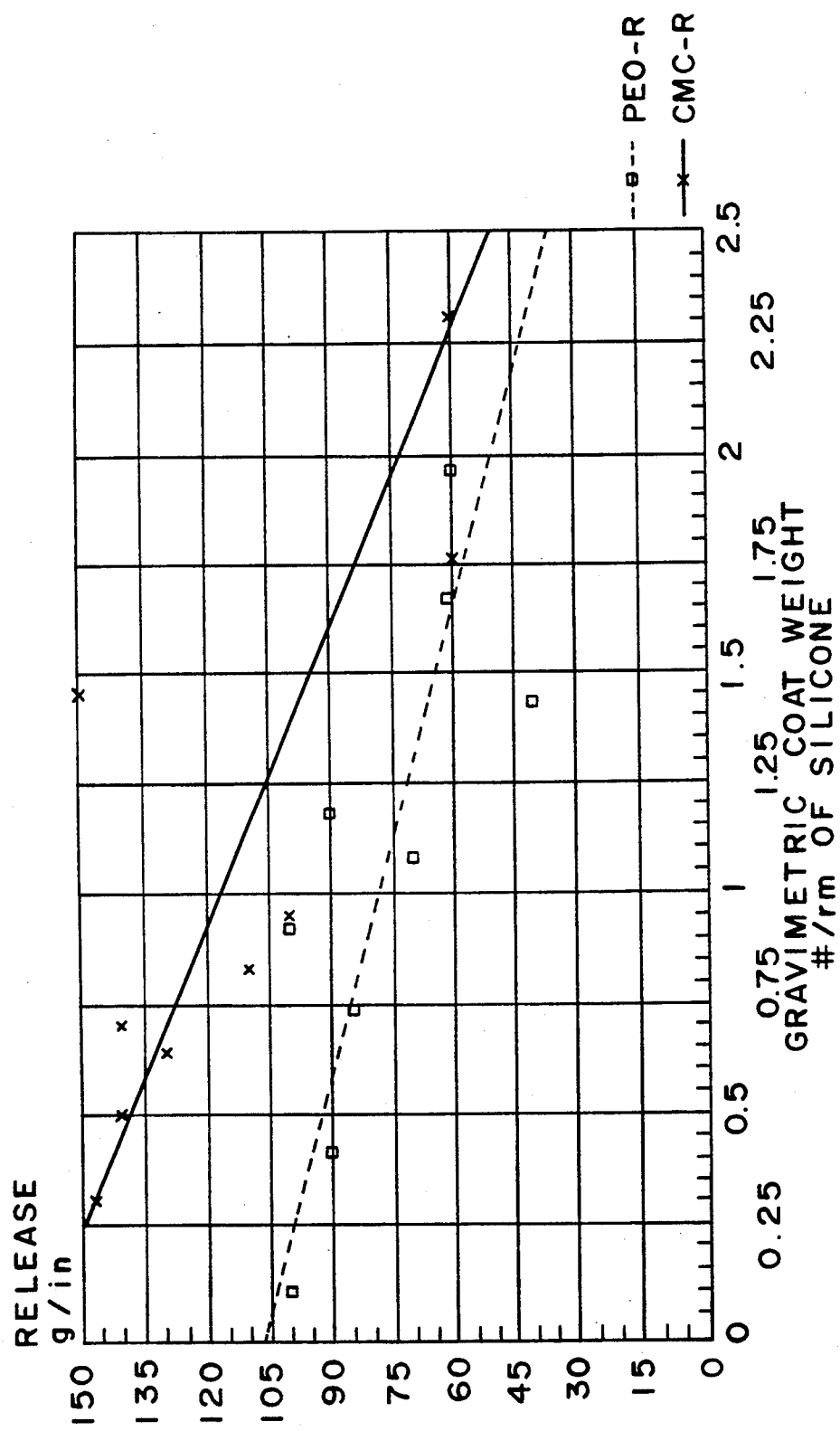

SILICONE RELEASE COMPOSITION

This is a divisional of application Ser. No. 07/524,979 filed May 18, 1990, now abandoned.

The present invention is directed to silicone release coating compositions for substrates such as paper and paperboard More particularly, the invention relates to silicone release compositions and methods of applying the silicone composition to form coatings having increased silicone holdout from the paper.

BACKGROUND OF THE INVENTION

Silicones have been used extensively for a variety of uses including release coatings for paper and paperboard. Other exemplary uses of silicone coatings on paper and paperboard include imparting improved slip, abrasion resistance and water repellency. Silicone coating compositions suitable for release coatings are well known in the art The compositions are generally applied as an aqueous emulsion, a dispersion in an organic solvent, or in the compound form as a silicone polymer The compound form uses no carrier and is typically referred to as a solventless composition containing 100% actives.

Silicone coatings are known to have very good release properties for use with pressure sensitive adhesives. In such uses the silicone coated paper may be used as a release backing for pressure sensitive adhesive tapes and the like The release backing is easily removed to expose the adhesive surface Silicone coating compositions are particularly desirable for release coatings because they are non-toxic and are relatively inert to the pressure sensitive adhesives. Silicone coating composition further have the advantage of being able to be formed into compositions which have good flow properties so as to be easily applied by conventional coating equipment.

Release coatings must generally be easy to apply to the substrate and spread uniformly. The release coatings must provide a low release force from the adhesive and not adversely affect the subsequent adhesion of the pressure sensitive adhesive tape. Release force is generally intended to refer to the amount of peel force required to separate the adhesive coated tape from the release layer without transfer from the adhesive tape. The most efficient release coatings form uniform coatings, are readily cured and have a high gloss surface.

Silicone coating compositions used for release coating are typically applied to a paper, and cured in an appropriate manner to form the release backing. The silicone component may be, for example, a silanol terminated polydimethylsiloxane, a hydrogen terminated polydimethyl siloxane, or an organomodified siloxane having a terminal functional group such as a reactive hydroxyl or a reactive vinyl group. Crosslinking of the silicone is typically initiated by U.V. radiation, a catalyst, heat, or electron beam radiation. One example of a curable silicone composition may include a silanol terminated organopolysiloxane, a hydride polysiloxane crosslinking agent and a metal salt of a carboxylic acid as a catalyst. Other additives may be included in the compositions such as thickeners or emulsifying agents. The curing time for the silicone should be sufficiently fast to cure properly within the time constraints of the process and without requiring a subsequent curing step.

One example of a silicone release coating composition is disclosed in U.S. Pat. No. 4,190,688 where a silanol terminated, vinyl modified silicone is applied to paper as an emulsion. The catalyst disclosed is a platinum catalyst and a tin salt of a carboxylic acid. The silicone is curable at room temperature or at elevated temperatures.

Another example of an emulsion silicone coating composition is disclosed in U.S. Pat. No. 4,476,241. This composition includes a silanol terminated organomodified silicone and a tin dineodeconate catalyst. The coating composition is heated to an elevated temperature to promote crosslinking of the silicone. The silicone emulsion is reported to provide release coatings with a long bath life, stability, low odor and reactivity over a wide temperature range.

U.S. Pat. No. 4,201,808 relates to a solventless radiation curable silicone release coating containing an acryloxy or methacryloxy containing organomodified silicone, a polyacrylyl crosslinking agent and a photosensitive initiator. The composition is applied to a substrate and cured by U.V. radiation.

The general trend in the industry is to use reactive silicone aqueous emulsions since they are easy to form and can be easily applied using conventional coating equipment. The amount of the silicone applied to the substrate can be controlled by adjusting the concentration of the silicone in the emulsion. Solvent based silicone compositions can also be applied by conventional coating apparatus such as, for example, gravure, meyer rod or air knife coaters. These coating compositions do not generally require thickeners or other viscosity adjusting agents to produce a suitable coating. The viscosity of the silicone is generally sufficient to provide adequate coat weight and uniform application.

Solvent based silicone coating compositions can be used effectively to form uniform release coatings on substrates. These silicones, however, have several disadvantages which limited their use. The organic solvents used as the carrier for the silicones are generally volatile and create health related risks to workers and the environment. The solvents used in the silicone compositions must be removed by evaporation and, therefore, must be recovered to prevent escape of the vapors into the atmosphere. The solvent recovery equipment needed to prevent vapor loss to the environment requires a large capital expenditure and results in high energy operating costs. In addition, solvent based silicone compositions often require large curing ovens to properly cure the silicone. Solvent based coating compositions may require additional equipment to handle the solvents. The viscosity of solvent based silicone coating compositions can be adjusted by diluting the silicone with an appropriate solvent, such as for example, benzene, toluene or xylene. This dilution, however, increases the solvent handling and recovery expenses.

Solventless silicone coating compositions may be applied by several methods, such as a differential offset gravure coater. These silicone coating compositions can be used to produce good release coatings provided the coating is applied uniformly. Since the silicone composition is applied in the 100% actives form, care must be exercised to apply the coating uniformly and in very thin films to maintain an economically acceptable coat weight. To improve handling and coating rheology, these compositions may be diluted with a suitable solvent.

Aqueous silicone emulsions have the advantage of being easily formed and can be applied to a substrate using conventional apparatus, such as size press, meyer rod or gravure roll. Aqueous emulsions can be easily diluted with water to achieve the appropriate actives levels. Commercially available silicone emulsions are generally supplied at 30% to 50% actives. The silicone emulsion is usually diluted to about 8% to 20% actives to insure uniform application of the silicone on the paper.

A disadvantage of aqueous silicone emulsions for producing release coatings is the tendency of the silicone to penetrate the paper. Generally it is more desirable to increase the amount of silicone on the surface of the substrate, which is typically referred to as holdout. To improve holdout of the silicone, thickeners may be added to increase the viscosity and water binding capacity and to increase the amounts of silicone that can be applied to the substrate under normal running conditions. Thickeners typically used include modified cellulose derivatives such as carboxymethyl cellulose and modified gums.

Thickeners may be used to improve holdout of the silicone from the substrate, but the thickeners often impart undesirable properties to the coated sheet. Some thickeners may produce a decreased gloss to the cured silicone coating, reduce the adhesive release from the silicone coating, and inhibit curing of the silicone. As a result of these disadvantages, aqueous silicone emulsion coatings usually produce release coatings that do not provide the high gloss and adhesive release comparable with solvent based and solventless silicone coating compositions at the same coat weight. It is often necessary to apply a higher coat weight of an aqueous emulsions to achieve similar gloss and release properties of solventless and solvent based compositions.

Without the use of a suitable thickener in the aqueous silicone emulsion, the penetration of silicone into the substrate is sufficiently high to reduce the release and gloss properties. The coat weight of the silicone can be increased to accommodate for the penetration. The increased cost associated with the increased coat weight has prevented this from being a viable alternative to the use of thickeners in spite of the inherent disadvantages of using thickeners and viscosity adjusting agents.

The general trend is to use alternatives to the solvent based silicone compositions and the volatile organic solvents used in these compositions. Solventless compositions do not provide the versatility of application of the silicone and are more difficult to apply economically and uniformly. The performance deficiencies of aqueous silicone emulsions has, however, limited their use and hindered conversions from the use of organic solvents.

There is still a need for a silicone coating composition which can be used without the volatile organic solvents and is able to provide uniform silicone coatings with sufficient silicone holdout. The present invention is directed to an aqueous silicone emulsion composition which is able to provide good release properties and is easy to apply without excessive coat weight The composition and method of the invention produce silicone release coatings exhibiting release and gloss properties which have heretofore only been obtainable from solvent based or solventless silicone compositions.

SUMMARY OF THE INVENTION

The invention is directed to a silicone release coating composition which exhibits reduced penetration of the silicone into a paper or other porous substrate. The invention is further directed to a method of producing effective silicone release coatings and to a method of reducing the penetration of the silicone into the substrate.

The silicone coating composition includes a mixture of a curable silicone polymer, a crosslinking catalyst and an effective amount of a water soluble high molecular weight polymer as a thickening agent The silicone polymer may be any silicone suitable for use as a release coating on a substrate. The silicone is preferably at least dispersible in water at room temperature. The preferred silicone polymers are the polydimethylsiloxane polymers, although the organomodified polymers may be used. In the preferred embodiment, the silicone is a polyaddition cure silicone. Alternatively the silicone may be condensation cure silicones, electron beam or radiation cure silicones or metal catalyst cure silicones.

The silicone catalyst is included in an amount needed to effectively catalyze the crosslinking of the silicone polymer. The type of catalyst included will depend on the particular silicone employed and the curing conditions. The catalyst in the preferred embodiments is a platinum, rhodium or tin type metal catalyst.

The thickening agent is a water soluble, aliphatic linear high molecular weight polymer having a molecular weight of at least about 100,000 g/molemw preferably at least about 500,000 g/molemw and most preferably at least 1,000,000 g/molemw to about 10,000,000 g/molemw. In the preferred embodiment, the thickening agent is polyethylene oxide and is included in an effective amount to provide sufficient holdout of the silicone on the coated substrate. The polyethylene oxide has a molecular weight from at least about 100,000 to 10,000,000, preferably at least 500,000 and most preferably at least 1,000,000. In alternative embodiments, the thickening agent may be a linear water soluble aliphatic polymer such as polyacrylamides, polypropylene oxides, and copolymers of polyethylene oxide and polypropylene oxide.

The silicone release composition in the preferred embodiment is an aqueous dispersion containing from about 10% to 98% by weight of a curable silicone, about 1% to 10% by weight of a crosslinking catalyst and about 0.01% to 30% by weight of a water soluble polyethylene oxide, wherein the percentages are by weight based on the total weight of actives in the aqueous emulsion.

The silicone release coatings are produced by forming the aqueous emulsion and applying a uniform coating onto a paper or other porous substrate by a size press, meyer rod or gravure roller. The coated substrate is then dried and cured to produce the silicone release coating.

BRIEF DESCRIPTION OF THE DRAWINGS

FIG. 1 is a graph of the release properties verses the coat weight for the silicone emulsions.

DETAILED DESCRIPTION OF THE INVENTION

The disadvantages and limitations of the previous methods of applying silicone release coatings are obviated by the present invention while providing an effective and cost efficient method of producing silicone release coatings More specifically, the present invention is directed to a silicone release composition and to a method of applying the release composition with improved holdout of the silicone compared to the previous methods and aqueous emulsion silicone release compositions.

The silicone release composition of the invention is an aqueous emulsion which can be applied to a substrate using conventional coating apparatus. The release composition can be easily applied as a uniform coating and in a cost effective manner compared with conventional aqueous emulsion silicone release compositions. The release coatings produced by the composition of the invention have a high surface gloss and a smooth texture with improved holdout of the silicone from the substrate.

The silicone release coatings are produced from an aqueous emulsion of a curable silicone. The silicone of the invention is not limited to any particular type. Silicones suitable for use in producing release coatings are well known in the art. The silicone should be at least partially dispersible in water and be curable onto the substrate without destruction of the substrate or the loss of the effectiveness of the resultant release coating.

The silicone polymer may be selected by the specific release capabilities or other desired properties. Exemplary silicone release compositions include the polydimethylsiloxanes and the organomodified siloxanes. The silicone may be, for example, silanol-containing organosilicones which can be crosslinked in the presence of a metal catalyst at an elevated temperature This type of silicone may also have functional groups which are able to react with water to form a reactive silanol. Other reactive silicones which can be used are the polydimethyl siloxanes such as those sold under the trade name PC-188 from PCL, Inc. and SYL-OFF 22 from Dow-Corning. The emulsion of the invention preferably contains about 10% to 98% silicone based on the total weight of actives in the emulsion and excluding the weight of the water of the emulsion.

Other reactive silicones may include silicones having unsaturated organic pendant groups which can be crosslinked by electron beam or U.V. radiation. Examples of such silicones include siloxanes having a vinyl pendent group, and acrylic or methacrylic pendent groups.

The above reactive silicones generally require a catalyst to initiate the crosslinking. The catalysts employed to initiate curing or crosslinking of the organopolysiloxanes used to form the release coatings are well known in the art and commercially available. The catalysts may be, for example, tin octoate, zinc octoate, tin butyrate, dibutyl tin diacetate, dibutyl tin dilaurate, dibutyl tin dioctoate, dioctyl tin dilaurate and dioctyl tin S,S$^1$-bis-(iso-octyl mercapto acetate). Other curing catalysts may include, for example, platinum, rhodium and compounds thereof. Examples of the catalysts include elemental platinum, rhodium, tin, zinc and coordination complexes thereof on a carrier such as charcoal, alumina and the like. The catalyst may be a soluble compound of platinum or rhodium such as platinum chloride, chloroplatinic acid, complexes with cyclohexene, ethylene and the like. In practice the catalysts are commercially obtained in the aqueous emulsion form with an effective amount of a silicone crosslinking agent. The crosslinking silicone may be, for example, an organomodified silicone having a vinyl pendant group. One example of a suitable catalyst is sold as an aqueous emulsion of a platinum organic complex and a methyl-vinyl terminated silicone sold under the trade name PC-60 by PCL, Inc. The emulsion of the invention preferably contains about 1.0% to 10% of the catalyst emulsion of a silicone crosslinking agent and a metal catalyst based on the total weight of actives in the emulsion.

The aqueous coating emulsion of the silicone release polymer includes an effective amount of a thickening agent to promote holdout of the silicone from the porous substrate. The thickening agent is a linear aliphatic polymer having a molecular weight of at least about 100,000 g/molemw and is soluble or dispersible in water at room temperature of about 70° F. In the preferred embodiments the polymeric thickening agent has a molecular weight of at least 500,000 and most preferably at least 1,000,000 g/molemw to about 10,000,000. The preferred polymer is polyethylene oxide having a molecular weight of at least about 100,000, g/molemw preferably at least 500,000 g/molemw and most preferably at least 1,000,000 g/molemw . Other suitable polymers may include, for example, polyacrylamides, polypropylene oxide and polyethyleneoxide/polypropylene oxide copolymers which are water soluble and have a molecular weight of at least about 100,000 g/molemw. The polymers are preferably linear aliphatic, non-cyclic polymers.

The polyethylene oxide polymer of the preferred embodiment is soluble or at least partially soluble in water at room temperature of about 70° F. Preferably the polyethylene oxide is a solid and has a molecular weight of at least about 100,000 g/molemw to 10,000,000 g/molemw preferably at least about 500,000 and most preferably at least about 1,000,000. A commercially available polyethylene oxide suitable for practicing the invention is sold under the trade name Polyox (WSR-301) by Union Carbide Co. This polyethylene oxide is sold as 99% actives.

The silicone release coating composition of the invention is prepared as an aqueous emulsion. In the preferred embodiment of the invention the aqueous emulsion contains about 10% to about 50% actives based on the total weight of the emulsion. Preferably the emulsion contains about 30% to 35% by weight actives. The emulsion is produced by blending a curable water dispersible silicone with a curing catalyst and a linear high molecular weight polymer thickening agent The emulsion contains preferably about 10% to 98% reactive silicone, an effective amount of a catalyst and 0.01% to 30% of the polymer thickening agent, wherein the percent is by weight based on the total weight of the actives in the emulsion excluding the water in the emulsion. Preferably the emulsion contains about 1% to 10% of an aqueous emulsion of a metal catalyst and a silicone crosslinking agent. The term actives is intended to refer to the liquid and/or solid components in the emulsion absent any water or other carrier liquid in the emulsion.

The silicone release composition as an emulsion may be applied to the substrate by any conventional coating device as well known in the coating art. The coating apparatus suitable for use by the aqueous silicone emulsion includes, for example, reverse roll coating, high speed trailing blade coater, meyer rod, bent blade, short dwell coaters, curtain coating, doctor knife, brushing, spraying or dipping the substrate in the emulsion. The silicone emulsion is preferably applied as a uniform continuous coating. The amount of the curable composition applied to the substrate varies depending on the properties of the release coating and the particular formulation used. Practical limitations of the coating weight will be dictated by the method of application, although there are no absolute upper or lower limits for the coat weight. Under normal conditions the coat weight will be as low as possible without sacrificing efficacy for cost effectiveness. Silicone release coated paper stock for use with pressure sensitive adhesives can be produced using a coat weight from about 0.1 pound per ream (3300 sq. ft.) to about 3 pounds per ream. Preferably, the coat weight is between about 0.17 pounds per ream and about 1.6 pounds per ream.

The coated substrate is then passed to a drying and curing station. Drying of the coated substrate can be carried out at an elevated temperature to remove excess water. A suitable cure temperature can be, for example, about 200° F. to 350° F., preferably about 300° F. to 350° F. The silicone release polymers which are heat activated to crosslink the silicone can be dried and cured in a simultaneous step by passing the coated substrate through an oven. The drying and curing step may be performed by heating from about 200° F. to about 400° F. and preferably in the range of about 300° F. to 350° F. The drying and curing time will usually be complete in about one minute depending on the oven temperature, silicone emulsion concentration, and coat weight.

The aqueous silicone emulsion may contain additional additives such as binders, viscosity adjusting agents and thickeners. The thickener may be, for example, modified cellulosic compounds such as carboxymethyl cellulose, methyl cellulose, hydroxyethyl cellulose and hydroxypropyl cellulose. The cellulosic compounds preferably have a molecular weight of about 5,000 to 2,000,000. In the preferred embodiment of the invention the thickener is carboxymethyl cellulose. When a cellulose thickener is used, it is included in the emulsion in the amount of about 1% to about 50% by weight of actives in the emulsion.

Other additives may include, for example, control release additives, antimicrobial agents, pigments such as fumed silica pigments, antifoam agents, emulsifiers, cure accelerators or cure inhibitors. Cure inhibitors may be used to prevent premature curing in a single package system and to extend the shelf-life. Suitable cure inhibitors may include dialkyl carboxylic ester inhibitors such as diallylmaleate, diallylphthalate and dimethylmaleate.

The invention is primarily directed to applying a silicone release coating to paper and paperboard. The substrate may be uncoated or precoated with a suitable coating such as clay. Other suitable substrates include glass, metal, kraft paper, polyethylene coated kraft paper, supercalendered kraft paper, polyethylene films, polypropylene films, polyester films such as Mylar, woven and non-woven fabrics. The substrate should be nonreactive with the coating and stable to the curing or crosslinking reaction.

The silicone emulsion of the invention has been found to be easily applied to the substrate and produces a release coating which experiences less penetration into the substrate. The use of polyethylene oxide as the polymeric thickener in the silicone emulsion has shown enhanced holdout properties of the emulsion compared to thickeners such as carboxymethyl cellulose. Although the mechanism of the high molecular weight polymer is not completely understood, it has been proposed that the high molecular weight linear water soluble polymer interacts in some manner with the silicone to reduce penetration. The polyethylene oxide may compete for hydrogen bonding cites on the substrate to reduce penetration of the silicone into the substrate. The improved holdout of silicone allows reduced coat weight of the emulsion without reducing the high gloss and the easier level of release at given application rate of silicone. The release coatings produced by the invention have a higher gloss and release properties which have not been obtainable from conventional silicone emulsions. As used herein the term holdout is intended to refer to the amount of the silicone which does not penetrate into the porous substrate and remains on the surface of the substrate to serve as a release coating.

EXAMPLE I

This example compares the holdout and release coating properties of a silicone emulsion coating containing polyethylene oxide with a silicone release coating containing carboxymethyl cellulose as the thickening agent.

A first emulsion coating composition was prepared from a polydimethyl siloxane sold under the trade name PC-188 by PCL, Inc. The silicone as received from the manufacturer contained about 40% by weight actives. The silicone was mixed with a catalyst sold under the trade name PC-60 by PCL, Inc. as an aqueous emulsion at 40% actives. The catalyst was an aqueous emulsion of a platinum complex and silicone polymer having a methylvinyl pendant group. The polyethylene oxide was sold under the trade name Polyox (WSR-301) by Union Carbide Corp. The resulting silicone aqueous emulsion contained 94% by weight silicone, 4.5% by weight catalyst emulsion and 1.5% polyethylene oxide based on the total weight of the dry components in the emulsion, excluding the water of the emulsion. The emulsion had about 35% by weight solids and a Brookfield viscosity of 1240 CPS at 72° F.

A standard sheet of coated base stock was weighed prior to coating with the silicone. The base stock was a 98 lb. sheet precoated with a clay. The silicone coating was applied using a pilot trailing blade coater. The sheet was then weighed immediately thereafter to determine the wet weight of the silicone coating. The sheet was then placed in an oven to cure the silicone by heating at about 300° F. for about 1 minute. From the wet weight of the coating and the coating solids, a calculation was made to determine the dry silicone coat weight. The calculated coat weight is recorded in Table 1 and Table 3. The above procedure was repeated to prepare a number of samples having varying coat weights. The samples are identified as PEO-1 through PEO-18. The cured sheets were then analyzed using an Oxford X-ray analyzer to determine by X-ray fluorescence the amount of surface silicone. These results of Samples PEO-12 to PEO-18 are compared with the results obtained by gravimetric analysis a shown in Table 3.

A second coating composition was then prepared as above containing 94% by weight silicone, 4.5% by weight catalyst emulsion and 1.5% by weight carboxymethyl cellulose. The silicone and catalyst components were the same components as above. The carboxymethyl cellulose was a commercially available product sold under the trade name CMC-7L2 by Hercules, Inc. at 94% solids. The emulsion had about 33% by weight actives and a Brookfield viscosity of 2260 cpc at 72° F.

The coating composition containing the carboxymethyl cellulose was coated onto a clay coated, 98 lb. paper stock by the above procedure to prepare a number of samples identified as sample CMC-1 through CMC-20. The results of the calculated coat weight are recorded in Table 2 and Table 3.

The samples of the polyethyleneoxide and carboxymethyl cellulose coating compositions were then tested for gloss with a 75 degree Gardner Glossmeter. The results are recorded as shown in Table 1 and Table 2 respectively.

The coated sheets were then tested for their release properties. A pressure sensitive tape sold under the trade name Scotch-Cal by 3M Company was applied to each sample sheet and rolled with four passes with a standard 4.5 lb Tappi roller as determined by the Technical Association of the Pulp and Paper Industry. The sample sheets were then trimmed down to one inch by six inch strips. A 140 degree release test was pulled on an Instron instrument at 8 inches per minute. The Instron pulls the tape at a constant speed and records the release properties in grams per inch. The results of Samples PEO-1 to PEO-11 and CMC-1 to CMC-12 are recorded in Tables 1 and 2.

FIG. 1 is a graph plotting the release properties of the coatings in grams per inch against the gravimetric coat weight in pounds per ream of paper. As shown, in FIG. 1 the silicone emulsion containing polyethylene oxide has a lower release at a given coat weight than the silicone emulsion containing carboxymethyl cellulose.

TABLE 1

| Sample No. | PEO Gravimetric Cwt. (#/rm) | PSA Release (g/in) | Gardner Gloss (points) |
|---|---|---|---|
| PEO-1 | 0.2034 | 100 | 18.7 |
| PEO-2 | 0.4139 | 90 | 21.2 |
| PEO-3 | 0.7409 | 85 | — |
| PEO-4 | 0.8386 | — | 25.1 |
| PEO-5 | 0.9244 | 100 | 25.5 |
| PEO-6 | 1.0796 | 70 | 33.0 |
| PEO-7 | 1.1784 | 90 | 40.4 |
| PEO-8 | 1.4324 | 41 | 37.2 |
| PEO-9 | 1.6723 | 60 | 41.1 |
| PEO-10 | 1.9600 | 60 | 37.6 |
| PEO-11 | 2.6578 | — | 68.5 |

TABLE 2

| Sample No. | CMC Gravimetric Cwt. (#/rm) | PSA Release (g/in) | Gardner Gloss (points) |
|---|---|---|---|
| CMC-1 | 0.3034 | 145 | 10.0 |
| CMC-2 | 0.5002 | 140 | 16.0 |
| CMC-3 | 0.6482 | 130 | 18.0 |
| CMC-4 | 0.7077 | 140 | 18.5 |
| CMC-5 | 0.8386 | 110 | 19.8 |
| CMC-6 | 0.9516 | 100 | 20.0 |
| CMC-7 | 1.4214 | 150 | 26.8 |
| CMC-8 | 1.7544 | 60 | 39.4 |
| CMC-9 | 1.7604 | 60 | 35.2 |
| CMC-10 | 2.3075 | 60 | 44.8 |
| CMC-11 | 2.5234 | — | 45.6 |
| CMC-12 | 3.0237 | — | 52.9 |

TABLE 3

| Sample No. | CMC Gravimetric Cwt. (#/rm) | CMC Oxford Cwt. (#/rm) | Calculated Difference (%) |
|---|---|---|---|
| CMC-13 | 0.5011 | 0.32 | 64% |
| CMC-14 | 0.6482 | 0.32 | 49% |
| CMC-15 | 0.7077 | 0.31 | 44% |
| CMC-16 | 0.8386 | 0.40 | 47% |
| CMC-17 | 0.9516 | 0.38 | 40% |
| CMC-18 | 1.4214 | 0.63 | 44% |
| CMC-19 | 1.4571 | 0.56 | 39% |
| CMC-20 | 1.5879 | 0.75 | 47% |

| Sample No. | PEO Gravimetric Cwt. (#/rm) | PEO Oxford Cwt. (#/rm) | Calculated Difference (%) |
|---|---|---|---|
| PEO-12 | 0.7409 | 0.60 | 81% |

TABLE 3-continued

| PEO-13 | 0.8386 | 0.50 | 60% |
| PEO-14 | 0.9244 | 0.50 | 54% |
| PEO-15 | 1.0796 | 0.71 | 68% |
| PEO-16 | 1.4324 | 1.18 | 82% |
| PEO-17 | 1.6723 | 0.97 | 58% |
| PEO-18 | 1.9600 | 1.13 | 57% |

The data as shown in Table 3 demonstrate that the silicone emulsion containing polyethylene oxide as the thickening agent retained a higher percentage of the silicone on the surface of the coated paper compared with carboxymethyl cellulose as the thickening agent as determined by X-ray analysis. As shown in Table 3 the amount of silicone on the surface of the paper as determined by X-ray analysis ranged from about 81% to 54% of the applied coat weight for the polyethylene oxide containing coating. The carboxymethyl cellulose-containing coating retained from about 64% to about 39% of the silicone on the surface. The differences between the carboxymethyl cellulose thickened coating and the polyethylene oxide thickened coating were shown to be statistically significant with 95% confidence up to a gravimetric coat weight of 1.5 pounds per ream.

The above data of Table 1 and Table 2 shows that the release and gloss properties of the coated paper are a function of the amount of silicone remaining on the surface of the paper. The polyethylene oxide thickened coating shows a higher gloss and an easier release level compared to the carboxymethylcellulose thickened coating at a given gravimetric coat weight.

EXAMPLE II

Sample silicone emulsions containing polyethylene oxide or carboxymethyl cellulose were prepared as in Example I and applied to an impervious polyester substrate and identified as Samples CMC-21 to CMC-25 and PEO-19 to PEO-23. The substrate was a sheet of material sold under the trade name Mylar by Dupont. The coated Mylar samples were then examined for surface silicone content using the Oxford X-ray analyzer as in Example I. A pressure sensitive tape release test was then prepared in the manner as in Example I above. The results as shown in Table 4 record the silicone content as coat weight in pounds per ream and the pressure sensitive adhesive release in grams per inch.

TABLE 4

| Sample No. | Oxford coat wt (#/rm) | PSA Release (g/inch) |
|---|---|---|
| CMC-21 | 0.050 | 50 |
| CMC-22 | 0.250 | 35 |
| CMC-23 | 0.625 | 20 |
| CMC-24 | 0.825 | 8 |
| CMC-25 | 0.975 | 8 |
| PEO-19 | 0.225 | 55 |
| PEO-20 | 0.675 | 25 |
| PEO-21 | 0.775 | 20 |
| PEO-22 | 0.900 | 15 |
| PEO-23 | 0.975 | 12 |

The data shown in Table 4 demonstrate that the release properties of the silicone coating containing polyethylene oxide and carboxymethyl cellulose are comparable at equal coat weights on an impervious substrate. This data supports the position that the increase in gloss and release properties of the polyethylene oxide-containing coating is a direct result of the increased holdout of the silicone on the surface of the coated paper resulting from the use of the polyethylene oxide.

EXAMPLE III

This example compares the release and gloss properties of paper coated with an emulsion containing a silicone and a mixture of polyethylene oxide and carboxymethyl cellulose compared with a coating composition of a silicone and carboxymethyl cellulose. The silicone, polyethylene oxide and carboxymethyl cellulose were as in Example I. An aqueous emulsion was prepared as in Example I containing 62.7% by weight silicone, 6.3% by weight catalyst, 29.4% by weight carboxymethyl cellulose and 1.6 % by weight polyethylene oxide. The percentages are calculated on a dry weight basis and exclude the water in the emulsion. The emulsion contained about 69% by weight silicone and catalyst based on the total weight of the actives in the system. The emulsion had a Brookfield viscosity of 1800 cps at 72° F. and a Hercules viscosity of 87.3 cps at 72° F. The total solids content of the emulsions was about 15% by weight. The density was about 7.6 lbs/gal.

A second emulsion was prepared containing 53.8% silicone, 4.5% by weight catalyst emulsion and 41.7% by weight carboxymethyl cellulose. The percentages are calculated on a dry weight basis. The emulsion contained a total of about 68% by weight silicone polymer and catalyst and had a Brookfield viscosity of 3680 cps at 72° F. and a Hercules viscosity of 171.7 cps at 72° F. The aqueous emulsion had a total of 16% by weight solids and a density of 76 lbs/gal.

The emulsions were applied to a number of samples of clay-coated paper basesheet as in Example I and identified as Samples CMC-26 to CMC-29 and PEO-24 to PEO-27. The calculated coat weight and coat weights determined by X-ray fluorescence for the samples are shown in Table 5. The samples were then tested for release properties using a pressure sensitive adhesive tape as in Example I. The results are shown in Table 5.

The data shown in Table 5 demonstrate that the coatings containing polyethylene oxide resulted in less penetration of the silicone into the paper surface. The data further demonstrates that the polyethylene oxide improved the release characteristics which resulted from increased holdout of the silicone.

The above description of the invention is intended to be exemplary of the preferred embodiment of the invention. It will be readily understood by those skilled in the art that numerous alternative embodiments of the invention can be prepared without departing form the spirit and scope of the invention as defined in the following claims.

What is claimed is:

1. A process of forming a silicone release coating and increasing silicone holdout on a substrate, comprising
    a) applying a coating of a release composition of an aqueous emulsion to a substrate, wherein the aqueous emulsion contains from about 10% to 98% of at least one curable silicone for forming a release coating, an effective amount of a silicone crosslinking catalyst and about 0.01% to about 30% of at least one polymeric thickening agent capable of promoting silicone holdout on a substrate, wherein said thickening agent is soluble or partially soluble in water at room temperature and is a substantially linear aliphatic polymer having a weight average molecular weight of at least about 100,000 g/mole wherein said percentages are by weight actives based on the total weight of the actives in the emulsion, and wherein said linear aliphatic polymer is selected from the group consisting of polyacrylamides, polypropylene oxide, polyethylene oxides, and polyethylene oxide-polypropylene oxide copolymers; and
    b) drying and curing the coating.

2. The process of claim 1 comprising drying the coated substrate before curing the release compositions.

3. The process of claim 1 wherein the silicone is a heat curable silicone and wherein the release composition is cured by heating.

4. The process of claim 1 wherein the silicone is curable by U.V. radiation and the release composition is cured by subjecting the coated substrate to U.V. radiation for a period of time effective to cure the release composition.

5. The process of claim 1 wherein the catalyst is selected from the group consisting of platinum, rhodium, tin, zinc and complexes thereof.

6. The process of claim 1 wherein the catalyst is present in the amount of about 1% to 10% by weight based on the total weight of actives in the emulsion and is an aqueous emulsion of a silicone crosslinking agent and a metal catalyst.

7. The process of claim 1 wherein the release composition further includes a thickening agent selected from the group consisting of carboxymethyl cellulose, methyl cellulose, hydroxyethyl cellulose, and hydroxypropyl cellulose.

8. The process of claim 3 wherein the silicone is cured by heating to about 200° F to 400° F.

TABLE 5

| Sample No. | Total Applied Cwt. Gravimetric (#/rm) | Applied Silicone Cwt. Calculated (#/rm) | Measured Surface Silicone Oxford X-ray (#/rm) | PSA Release (g/in) |
|---|---|---|---|---|
| CMC-26 | 1.61 | 0.72 | 0.04 | >500 |
| CMC-27 | 1.15 | 0.52 | 0.06 | >500 |
| CMC-28 | 0.94 | 0.42 | 0.03 | >500 |
| CMC-29 | 0.66 | 0.30 | 0.02 | >500 |
| PEO-24 | 0.85 | 0.59 | 0.14 | 191 |
| PEO-25 | 0.78 | 0.54 | 0.22 | 60 |
| PEO-26 | 0.34 | 0.23 | 0.21 | 123 |
| PEO-27 | 0.17 | 0.12 | 0.17 | 129 |

The above examples show that the polyethylene oxide used with aqueous silicone emulsions is able to improve holdout of the silicone on the paper or paper board substrates. The cured silicone release coatings produced have increased release and gloss properties at a given coat weight compared to conventional aqueous silicone emulsions. The release and gloss properties at a given coat weight are comparable to those previously believed to have been obtainable only by solvent and solventless coating methods.

9. The process of claim 1 wherein the substrate is selected from the group consisting of paper, paper board, glass, metal, polyethylene, and polyester films.

10. The process of claim 9 wherein the substrate is paper precoated with clay.

11. The process of claim 1 wherein said silicone release coating is applied by a coating means selected from the group consisting of a trailing blade coater, bent blade, rod and short dwell coaters.

12. The coated substrate formed by the process of claim 1.

13. The process of claim 1 wherein said linear aliphatic polymer has a molecular weight of at least 500,000 g/mole.

14. The process of claim 1 wherein said linear aliphatic polymer has a molecular weight of at least 1,000,000 g/mole.

15. The process of claim 1 wherein said linear aliphatic polymer has a molecular weight of about 1,000,000 g/mole to about 5,000,000 g/mole.

16. A process of promoting silicone holdout in a silicone release coating on a substrate, comprising
   a) applying a coating of a silicone release composition on a substrate, wherein said silicone release composition is an aqueous emulsion comprising from about 10% to 98% of at least one curable silicone capable of forming a silicone release coating, an effective amount of a silicone crosslinking catalyst to crosslink said silicone, and about 0.01% to about 30% of a silicone holdout promoting linear aliphatic polymer which is water soluble or partially soluble in water at room temperature and has a weight average molecular weight of at least 100,000 g/mole, wherein said percentages are by weight actives based on the total weight of the actives in the emulsion, and wherein said linear aliphatic polymer is selected from the group consisting of polyacrylamides, polypropylene oxide, polyethylene oxide, and polyethylene oxide-polypropylene oxide copolymers.

17. The process of claim 16 wherein said linear aliphatic polymer has a molecular weight of at least 500,000 g/mole.

18. The process of claim 16 wherein said linear aliphatic polymer has a molecular weight of at least 1,000,000 g/mole.

19. The process of claim 16 wherein said linear aliphatic polymer has a molecular weight of about 1,000,000 g/mole to about 3,000,000 g/mole.

20. A process of forming a silicone release coating and increasing silicone holdout on a substrate, comprising:
   a) applying a coating of a release composition of an aqueous emulsion to a substrate, wherein the aqueous emulsion contains from about 10% to 98% of at least one curable silicone for forming a release coating, an effective amount of a silicone crosslinking catalyst and about 0.01% to about 30% of at least one polymeric thickening agent capable of promoting silicone holdout on a substrate, wherein said thickening agent is soluble or partially soluble in water at room temperature and is a substantially linear aliphatic polymer having a weight average molecular weight of at least about 500,000 g/mole, wherein said percentages are by weight actives based on the total weight of the actives in the emulsion; and
   b) drying and curing the coating.

21. The process of claim 20 wherein said linear aliphatic polymer has a molecular weight of at least 1,000,000 g/mole.

22. The process of claim 20 wherein said linear aliphatic polymer has a molecular weight of about 1,000,000 g/mole to about 5,000,000 g/mole.

* * * * *